United States Patent [19]

Solaroli

[11] 4,389,787
[45] Jun. 28, 1983

[54] GAUGE FOR THE GEOMETRICAL AND/OR DIMENSIONAL CHECKING OF PIECES ROTATING ABOUT A GEOMETRICAL AXIS

[75] Inventor: Sergio Solaroli, Bologna, Italy

[73] Assignee: Finike Italiana Marposs S.p.A., S. Marino di Bentivoglio, Italy

[21] Appl. No.: 264,217

[22] Filed: May 15, 1981

[30] Foreign Application Priority Data

May 16, 1980 [IT] Italy .................. 3427 A/80

[51] Int. Cl.³ .................. G01B 7/12; G01B 7/28
[52] U.S. Cl. .................. 33/174 Q; 33/174 P; 33/174 PA; 33/143 L
[58] Field of Search .......... 33/174 Q, 172 E, 174 L, 33/174 P, 174 PA, 143 L

[56] References Cited

U.S. PATENT DOCUMENTS

| 3,166,852 | 1/1965 | Whitney | 33/174 L |
| 4,077,130 | 3/1978 | Possatti | 33/174 L |
| 4,084,322 | 4/1978 | Albertazzi | 33/174 Q |

Primary Examiner—Willis Little
Attorney, Agent, or Firm—Stevens, Davis, Miller & Mosher

[57] ABSTRACT

The apparatus includes a frame, a plate coupled to a shaft for making the piece to be checked rotate with respect to the frame and a reference plate resting on the piece for defining a mechanical reference for the checking of the piece. A supporting device couples the reference plate to the frame and permits rotation of the reference plate together with the piece. Measuring heads, fixed to the frame, include feeler elements which contact - without any sliding motion - the supporting device, for indirectly detecting the position of the mechanical reference during the piece rotation.

10 Claims, 4 Drawing Figures

GAUGE FOR THE GEOMETRICAL AND/OR DIMENSIONAL CHECKING OF PIECES ROTATING ABOUT A GEOMETRICAL AXIS

The present invention relates to a gauge for the geometrical and/or dimensional checking of a piece rotating about a geometrical axis, the checking being made with reference to a part of the piece adapted to define a determined geometrical surface. The gauge includes a frame; piece supporting means, carried by the frame, for making the piece rotate about an axis; an element—supported by the frame—that rotates, together with the piece, about the axis, the element being adapted to cooperate with the piece in order to locate the geometrical surface with continuity during rotation; and gauging means, supported by the frame, including measuring heads adapted to provide signals representative of the position of said geometrical surface, depending on the position of the element.

In U.S. Pat. No. 4,233,744, there is described a gauge for the checking of pieces that can be manually rotated, wherein there is a floating plate that has a plane face which rests on a substantially plane surface of a piece. The forces of friction, that are transmitted from the surface to the face, cause the plate to rotate with the piece. The gauge includes gauging heads with feeler elements that contact the plate face in order to provide, in an indirect way, signals that are representative of the dimensional characteristics of the piece surface. This known gauge also includes gauging heads with feeler elements that directly contact other parts of the piece to be checked.

In the aforementioned known gauge there occurs an inconvenience, i.e. the feeler elements, by sliding on the plate face, scratch it, and moreover when many pieces have been checked, owing to possible displacements of the floating plate along a radial direction, with respect to the piece axis of rotation, there is formed a substantially annular zone with grooves generally differing from one another in depth and that are by no means irrelevant insofar as the dimensional piece tolerances are concerned. If a feeler element contacts a groove and then contacts another one, while the piece is being checked, the difference in depth between these two grooves is considered by the gauge as a dimensional change of the piece. In order to reduce to a minimum the consequences due to the presence of grooves it is necessary to periodically eliminate the grooves by grinding or honing the face of the plate. These operations are obviously expensive.

The feeler elements that directly contact parts of a piece rotating about an axis do not give rise to any inconveniences as they slide on the piece surface for a limited number of times and thus can only produce one or more grooves whose depth is irrelevant in respect of the dimensional piece tolerances.

An object of the invention is to provide a gauge for checking a piece rotating about an axis including a plate with a face resting on a surface of the piece and rotating with it, wherein the feeler elements—which provide signals responsive to the geometrical and dimensional characteristics of the surface—are not subjected to any sliding motion with respect to the elements with which they come into contact, and moreover one that is accurate, reliable and inexpensive.

This object is attained through a gauge which includes, according to the invention, a reference structure supported by the frame and adapted to cooperate with the element and with the measuring heads, the reference structure including a reference device, a first connection means for coupling the element to the reference device and for permitting the relative rotation of the element about the reference device, and a second connection means for connecting the reference device to the frame and for keeping the reference device in a predetermined position with respect to said geometrical surface, said measuring heads being adapted to cooperate with the reference device.

The invention is now described with reference to the accompanying drawings, given by way of non-limiting example, in which.

Figure 1:
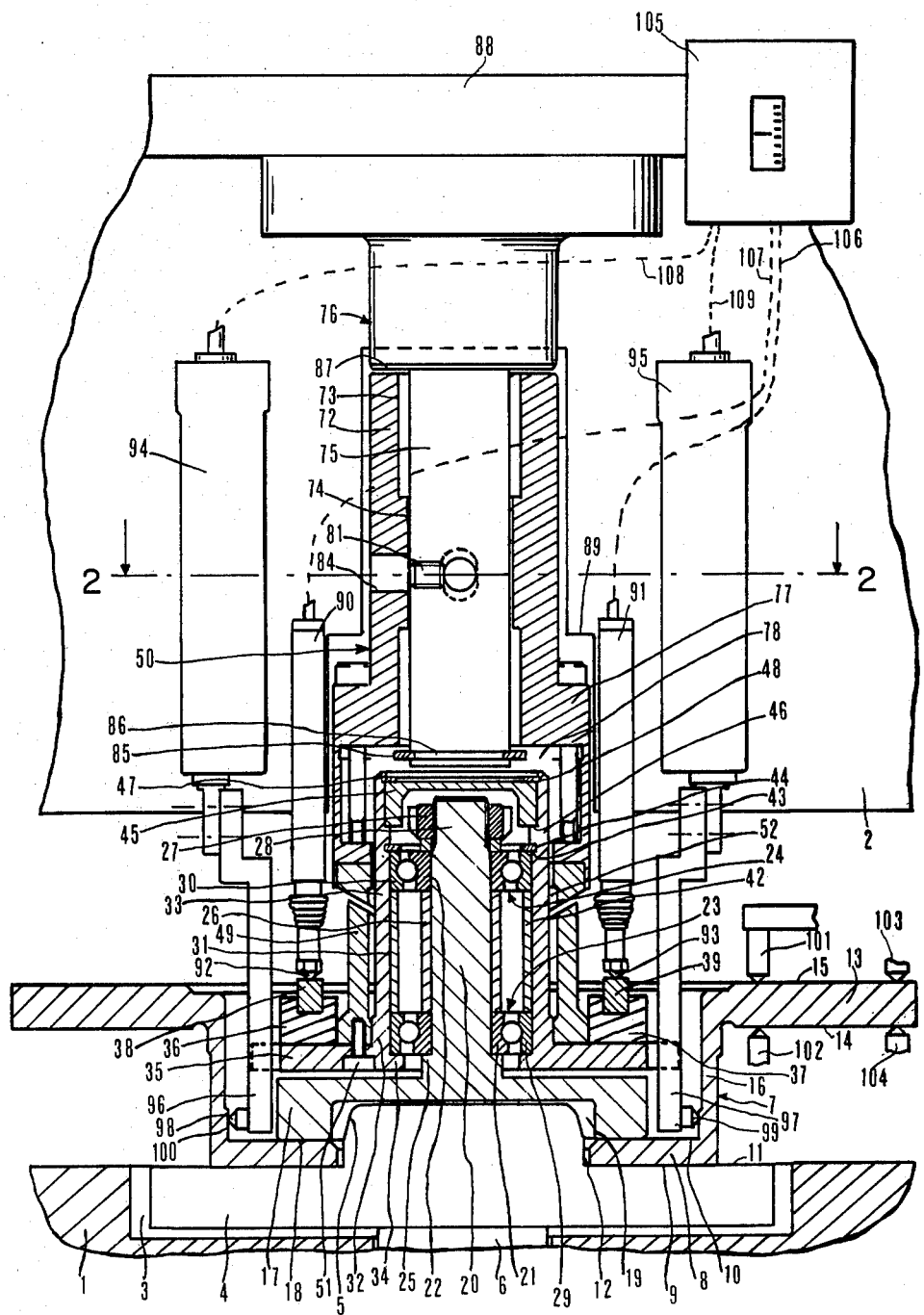
FIG. 1 is a simplified vertical sectional view of the gauge according to a preferred embodiment of the invention.
Figure 2:
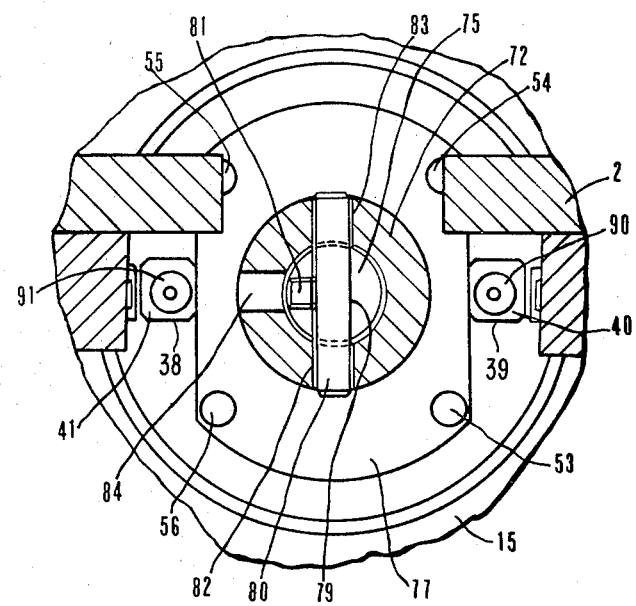
FIG. 2 is a sectional view of the gauge along line 2—2 of FIG. 1.

With reference to FIGS. 1 and 2, the gauge includes a frame, that is partially shown in the figures, with a base 1 and a vertical plate 2 connected to base 1 in a way that has not been shown.

Base 1 defines a seating 3 for a plate 4. Plate 4 has a centering nosepiece 5 and it is connected to a motor, not shown, by means of a shaft 6.

Piece 7 to be checked, consisting in a brake disk for automobiles, defines a base or support flange 8 with faces 9 and 10 that are substantially plane,—one of which 9, rests on a face 11 of plate 4—and a hole 12 for the passage of nosepiece 5 for the centering of piece 7 with respect to plate 4.

Furthermore piece 7 has a part 13, with a substantially circular annular shape, defining surfaces 14 and 15 that are planes and parallel to faces 9 and 10, and a portion 16 to connect part 13 to base 8. Portion 16 has substantially tubular shape with generatrices that are perpendicular to faces 9 and 10 and to surfaces 14 and 15. Surfaces 14 and 15 are the braking surfaces of the brake disk.

A plate 17 defines a plane face 18—with a circular crown shape—that rests on face 10 of piece 7 and a blind hole 19 that matches, with some axial and radial play, with centering nosepiece 5.

Plate 17 has a cylindrical pin 20 with generatrices that are perpendicular to face 18, upon which are keyed—with negative allowance—the internal rings 21 and 22 of two preloaded bearings 23 and 24. Pin 20 has a cylindrical projection 25 with a surface for resting a face of ring 21.

An axial tubular spacer 26, that matches with pin 20, has a base resting on the second face of ring 21 and a base resting on a face of ring 22.

A threaded ringnut 27—screwed onto threaded rod 28 of pin 20—spacer 26 and cylindrical projection 25 axially clamp the two rings 21 and 22.

The external rings 29 and 30 of bearings 23 and 24 are keyed with negative allowance to the wall of a cylindrical hole 31 of a bushing 32. Bushing 32 has a substantially tubular part 33 that defines hole 31, and a cylindrical projection 34 that has a surface upon which there rests a face of outer ring 29. Bushing 32 also comprises a cylindrical flange 35 to which are connected, in a way that is not shown, two substantially prismatic elements 36 and 37 with two inserts 38 and 39 of a wear resisting material. The two inserts 38 and 39 (FIG. 2) have plane surfaces 40 and 41 that are coplanar and parallel to the plane face 18 of plate 17. The parallelism is ensured, for example, by machining surfaces 40 and 41 and face 18 after having assembled plate 17 with bushing 32.

An axial tubular spacer 42, that is housed inside hole 31, has a surface resting on the second face of external ring 29 and a surface whereupon there rests a face of external ring 30.

A resilient ring 43, inserted in a groove 44 of hole 31, rests on the second face of external ring 30. Ring 43 together with spacer 42 and projection 34, axially clamp the two external rings 29 and 30. The end of hole 31, that is adjacent to threaded rod 28, is closed by a cylindrical cap 45 that has a base resting on a projecting part 46 of hole 31. A resilient ring 47, inserted in a groove 48 of hole 31 axially clamps cap 45.

A substantially tubular shaped joint 49 connects bushing 32 to a support element 50. Joint 49 has a base connected to flange 35 of bushing 32 by means of fixture screws, one of which, 51, is shown in FIG. 1, and a longitudinal hole 52 for the passage—with a radial clearance—of part 33 of bushing 32. The second base of joint 49 is fixed to support element 50 by means of screws 53–56 (FIG. 2).

Joint 49 (FIGS. 3 and 4) defines eight holes 57–64, that are adjacent two by two, and so defined four portions 65–68 that have a very small transversal thickness.

Figure 3:
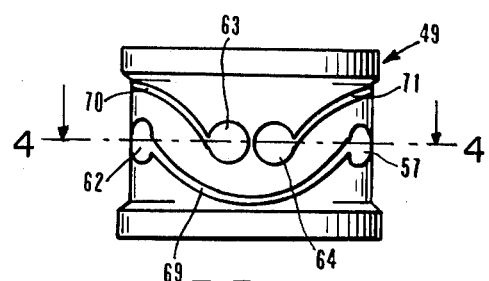
FIG. 3 is a front view of a part of the gauge shown in FIG. 1.
Figure 4:
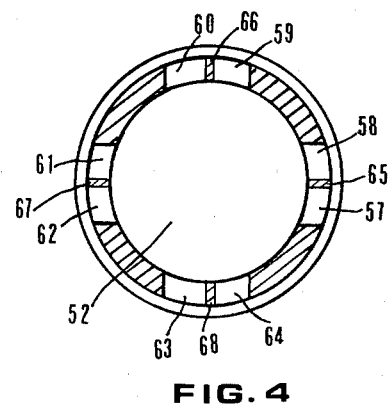
FIG. 4 is a sectional view along line 4—4 of FIG. 3.

Four cuts, only three of which 69–71, are shown in FIG. 3, connect two by two opposite holes 57–64 so that bushing 32 is connected to support element 50 by means of portions 65–68 only. Portions 65–68, as a consequence of their restricted transversal thickness, are resiliently flexible and define fulcrums that enable bushing 32 to accomplish limited rotational movements, with respect to the support element 50, about two axes, that are at right angles with respect to each other, and that pass through portions 65,67 and 66,68.

Support element 50 has a substantially tubular portion 72 defining a hole 73 with a section 74 that matches, with a small radial clearance, to a cylindrical pin 75 of a shaft 76. Element 50 also includes a flange 77 defining a cylindrical hole 78 housing an end of bushing 32, and holes for the passage of screws 53–56.

Cylindrical pin 75 defines a transversal hole 79 (FIG. 2) wherein there is inserted a cylindrical pin 80 clamped, with respect to pin 75, by a lag screw 81. Pin 80 is housed in two grooves 82 and 83 of portion 72 and prevents support element 50, joint 49 and bushing 32 from rotating about the longitudinal geometrical axis of pin 75. A hole 84, formed in portion 72, provides access to screw 81.

The axial displacements of support element 50 are restricted in one direction by the contacting of portion 72 with a resilient ring 85 inserted in a groove 86 of pin 75, and in the opposite direction by the contacting of portion 72 with a limit stop 87 of shaft 76.

Shaft 76 is clamped to a crosspiece 88 connected to plate 2. Plate 2 defines an opening 89 that houses at its interior the support element 50.

Two measuring or gauging heads 90 and 91, of the so called "pencil" or "cartridge" type, are connected to plate 2, in a way that is not shown and have feeler elements 92 and 93 that touch the plane surfaces 40 and 41 of inserts 38 and 39.

Two measuring or gauging heads 94 and 95 are connected, in a way that is not shown, to plate 2, and have arms 96 and 97 with feeler elements 98 and 99 that touch a surface 100 of cylindrical portion 16 at points that are diametrically opposite.

The gauging heads 90,91,94 and 95 are of a known type and are not consequently herein described in detail.

Feeler elements 101–104 of further gauging heads that are not shown touch surfaces 14 and 15 at points that lie in a vertical plane; the same also applies to feeler elements 92 and 93 that contact surfaces 40 and 41 and feeler elements 98 and 99 which contact surface 100.

The gauging heads are electrically connected to a power supply, processing and display unit 105 by means of leads 106–109 represented by dashed lines in FIG. 1.

The gauge works in the following way.

Base 1 is lowered, by sliding along guides of the frame which are not shown, and a brake disk 7 to be checked is loaded on plate 4. In this phase plate 17 is axially supported by the contacting of portion 72 with resilient ring 85.

Base 1 is then raised and brought back to the measuring position which is defined due to the contact with mechanical references that are not shown. During the raising of base 1, face 10 of brake disk 7 comes into contact with the plane face 18 of plate 17 and it moves portion 72 away from resilient ring 85, so that the weights of support element 50, joint 49, bushing 32, plate 17 and of any other parts coupled to them are applied onto face 10 of brake disk 7.

Bushing 32, by rotating about fulcrums defined by joint 49, enables the positioning of face 18 of plate 17 on three points of face 10 in order to define a reference plane, integral to brake disk 7, to which refer the outcomes of the geometrical and dimensional check of brake disk 7.

The reason for the choice of face 10 as a reference in the checking of brake disk 7, resides in that face 10 shall abut against a corresponding plane shoulder of a hub to which brake disk 7 will be thereafter fixed.

When base 1 is in the measuring position, "retraction" elements, not shown, that formerly had moved feeler elements 102 and 104 away, in order to prevent their interference with brake disk 7, are deactivated and the feeler elements 102 and 104 come into contact with surface 14.

Plate 4 is made to rotate about the longitudinal geometrical axis of shaft 6, that is perpendicular to face 11, and leads brake disk 7 and plate 17 into rotation about the same axis. If surfaces 9 and 10 of brake disk 7 show a parallelism error, the reference plane defined by face 18 of plate 17 does not place itself perpendicularly with respect to the axis of rotation of brake disk 7, and the axis of rotation defined by bearings 23 and 24—about which plate 17 rotates with respect to bushing 32—becomes oblique with respect to the axis of rotation of brake disk 7.

As plate 17 rotates about the axis defined by bearings 23 and 24, bushing 32 concurrently oscillates with respect to support element 50, rotating about the fulcrums defined by portions 65–68 of joint 49. Consequently, the orientation of the rotation axis defined by bearings 23 and 24 varies instant by instant, so that the movement of plate 17, with respect to support element 50, and consequently with respect to the frame to which the latter is connected, is a rotation about the axis of rotation of brake disk 7.

The orientation of the reference plane defined by face 18, in the course of the rotation of plate 17, is detected by the two measuring heads 90 and 91 whose feeler elements 92 and 93 touch surfaces 40 41 without any sliding motion surfaces 40 and 41 remain parallel to the reference plane defined by face 18. The signals provided by gauging heads 90 and 91 are sent to unit 105 where they are processed in order to define an electric reference to which refer the outcomes of the inspection of the brake disk 7.

The gauge enables checking in a simple way, for example, the parallelism of face 14, or of face 15, with respect to face 10 by processing the signals provided by the measuring heads 90 and 91 and those provided by the measuring heads comprising feeler elements 101-104; the processing consists in simple operations like additions, subtractions and/or multiplications by constant factors.

According to another embodiment of the foregoing gauge, there is foreseen the displacement of plate 2 with respect to base 1—that is fixed—for the loading of piece 7 on plate 4.

According to a further embodiment there is employed a rotating chuck that supports the piece from the top, and the upward approach of plate 17 to piece 7. According to this embodiment there are utilized springs to push the plate against the piece.

For connecting bushing 32 to the support element 50 it is also possible to use a joint of a different type with respect to the one described, for example it is possible to use resiliently flexible membranes.

Face 18 of plate 17 also can have a different geometrical shape than a plane one. For example, it can have a truncated cone shape or a part-spherical surface in the event that the pieces to be checked use tapered, truncated cone or spherical surfaces, respectively, as a reference for the measurements.

The shape of surfaces 40 and 41 can be identical to that of face 18, or otherwise it can be a plane if it is required to check just the spatial orientation of the piece reference surface.

It will of course be realized that while the above has been given by way of illustrative example many modifications of constructional detail and design could be made thereto by persons skilled in the art without departing from the broad scope and ambit of the invention as is defined in the appended claims.

What is claimed is:

1. A gauge for the geometrical and/or dimensional checking of pieces rotating about a geometrical axis, the checking being made with reference to a part of the piece adapted to define a determined geometrical surface, comprising: a frame; piece supporting means carried by the frame for making the piece rotate about said axis; an element—supported by the frame—that rotates, together with the piece, about said axis, the element being adapted to cooperate with the piece in order to locate said geometrical surface with continuity during rotation; gauging means, supported by the frame, including measuring heads adapted to provide signals representative of the position of said geometrical surface, depending on the position of the element; and a reference structure supported by the frame and adapted to cooperate with said element and with the measuring heads, the reference structure including a reference device, first connection means for coupling the element to the reference device and for permitting the relative of the element with respect to the reference device, and second connection means for connecting the reference device to the frame, and for keeping the reference device in a pre-determined position with respect to said geometrical surface, said measuring heads being adapted to cooperate with the reference device.

2. The gauge according to claim 1, for checking a piece adapted to define said geometrical surface as a plane surface, wherein said reference device defines a second plane surface, and the measuring heads cooperate with the second plane surface.

3. The gauge according to claim 2, wherein said second plane surface is parallel to the plane surface defined by the piece, said surfaces being in theory perpendicular to the piece rotation axis.

4. The gauge as claimed in one of claims 1 to 3, in which said measuring heads include feeler elements, wherein the feeler elements contact said reference device, the checking being substantially accomplished without any sliding of the feeler elements on the reference device.

5. The gauge according to one of claims 1 to 3, wherein the gauging means include further measuring heads with feeler elements adapted to directly contact parts of the piece, and processing circuits to process signals provided by the measuring heads to refer the outcomes of the checking to said plane surface defined by the piece.

6. The gauge according to one of claims 1 to 3, wherein said first connection means includes revolving bearings adapted to locate an axis for the relative rotation of the element with respect to the reference device.

7. The gauge according to one of claims 1 to 3, wherein said second connection means includes fulcrums for rotational displacements of the reference device with respect to the frame, about two axes defining directions that are perpendicular with respect to said axis for the relative rotation.

8. The gauge according to claim 7, wherein said first connection means include revolving bearings adapted to locate as axis for the relative rotation of the element with respect to the reference device, said piece supporting means include a rotating plate, said element includes a further plate with a pin housed in said revolving bearings and said second connection means include a support adapted to allow restricted displacements of the reference device, the further plate and the bearings according to the piece rotation axis.

9. The gauge according to claim 8, wherein the reference device includes a substantially tubular member with a hole adapted to seat the bearings in fixed axial positions, the member having a flange with inserts adapted to define said second plane surface.

10. The gauge according to one of claims 1 to 3, for checking a brake disk, wherein said reference device is adapted to cooperate with a face of the support flange of the brake disk and said gauging means are adapted to locate the position of said face in order to refer to it the outcomes of the checking.

* * * * *

UNITED STATES PATENT AND TRADEMARK OFFICE
CERTIFICATE OF CORRECTION

PATENT NO. : 4,389,787
DATED      : June 28, 1983
INVENTOR(S): Sergio SOLAROLI

It is certified that error appears in the above—identified patent and that said Letters Patent is hereby corrected as shown below:

Column 2, line 40, before "tubular shape" insert --a cylindrical--
Column 5, line 2, change "motion surfaces" to --motion. Surfaces--.

Claim 1, line 19, after "relative" insert --rotation--.

Signed and Sealed this

Sixth Day of December 1983

[SEAL]

Attest:

GERALD J. MOSSINGHOFF

Attesting Officer

Commissioner of Patents and Trademarks